United States Patent [19]

Nagashima

[11] Patent Number: 5,555,093
[45] Date of Patent: Sep. 10, 1996

[54] IMAGE PROCESSING APPARATUS AND METHOD THEREOF

[75] Inventor: Nao Nagashima, Yokohama, Japan

[73] Assignee: Canon Kabushiki Kaisha, Tokyo, Japan

[21] Appl. No.: 52,452

[22] Filed: Apr. 26, 1993

[30] Foreign Application Priority Data

Apr. 30, 1992 [JP] Japan ................................ 4-111751

[51] Int. Cl.⁶ .................................................. H04N 1/387
[52] U.S. Cl. ............................................ 358/296; 358/450
[58] Field of Search ................................ 358/296–304, 358/537–540, 401, 448, 450, 452, 453, 462, 464, 467

[56] References Cited

U.S. PATENT DOCUMENTS

| | | | |
|---|---|---|---|
| 4,639,791 | 1/1987 | Masaki | 358/300 |
| 4,682,190 | 7/1987 | Ikeda | 346/154 |
| 4,769,695 | 9/1988 | Terashita | 358/76 |
| 5,021,876 | 6/1991 | Kurita et al. | |
| 5,257,119 | 10/1993 | Funada et al. | 358/438 |
| 5,289,296 | 2/1994 | Yamada | 358/530 |
| 5,311,336 | 5/1994 | Kurita et al. | 358/80 |
| 5,333,213 | 7/1994 | Koyama et al. | |

Primary Examiner—Peter S. Wong
Assistant Examiner—K. Shin
Attorney, Agent, or Firm—Fitzpatrick, Cella, Harper & Scinto

[57] ABSTRACT

Input image data and a generated background image pattern are input into a selection circuit. A determination circuit determines whether the image data exceeds a predetermined threshold value, and outputs a determination signal to the selection circuit. If the determination signal indicates that the image data exceeds the threshold value, the selection circuit selects the input image data. If the determination signal indicates that the image data does not exceed the threshold value, the selection circuit selects the background image pattern, thereby replacing areas of the image data which do not exceed the threshold value with the background image pattern.

19 Claims, 7 Drawing Sheets

ORIGINAL IMAGE

BACKGROUND IMAGE PATTERN

SYNTHESIZED IMAGE

FIG. 4A
ORIGINAL IMAGE

FIG. 4B
BACKGROUND IMAGE PATTERN

FIG. 4C
SYNTHESIZED IMAGE

IMAGE PROCESSING APPARATUS AND METHOD THEREOF

BACKGROUND OF THE INVENTION

The present invention relates to an image processing apparatus and, more particularly, to an image processing apparatus having a function to synthesize a pattern with image data.

Recently, occasions for presentation have been increased in the business world and the like. Preparing materials for presentation is an important portion of the presentation. When data is organized using a computer, graphics and illustrations can be easily formed, resulting in more effective presentation. Accordingly, various types of color-application-software's have been generalized for making presentation materials.

However, when hand-written materials and on-hand monochrome materials are processed by a computer, it requires a long time to process them with materials made by the computer. In fact, it is difficult to utilize the on-hand materials with the materials formed by the computer.

In a monochrome copier, a technique to perform a hatch processing on an original image is well-known. In a color copier, for example, in the Color Laser Copier made by Canon, a window processing or superimposing processing is performed during character composition.

However, in the prior art, the problem arises in that a multi-color processing cannot be performed.

SUMMARY OF THE INVENTION

In the light of the drawback in the prior art, it is an object of the present invention to provide an image processing apparatus capable of processing materials on hand without using additional apparatus such as a computer.

It is another object of the present invention to provide a color image processing apparatus comprising: input means for inputting image data; background color pattern generation means for generating a background color pattern; synthesizing means for synthesizing the background pattern generated by the background pattern generation means with the image data inputted by the input means; and output means for outputting the image data which is synthesized by the synthesizing means.

It is another object of the present invention to provide an image processing method comprising: an input step of inputting image data; a background color pattern generation step of generating a background color pattern; a synthesizing step of synthesizing the background pattern generated by the background pattern generation step with the image data inputted by the input step; and an output step of outputting the image data which is synthesized by the synthesizing step.

Furthermore, it is another object of the present invention to provide an image processing apparatus comprising: input means for inputting image data; background color pattern generation means for generating a background color pattern; determination means for determining an area of the background of the image inputted by the input means; and replacement means for replacing the background area determined by the determination means with the background pattern generated by the background-pattern generation means.

Still further, it is another object of the present invention to provide an image processing method comprising: an input step of inputting image data; a background pattern generation step of generating a background pattern; a determination step of determining an area of the background of the image inputted by the input step; and a replacement step of replacing the background area determined by the determination step with the background pattern generated by the background pattern generation step.

With the above construction, the image processing apparatus and method of the present invention enable to easily form impressive materials by using the materials on hand.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

In the embodiments, the present invention is applied to a full-color copying machine, however, this does not impose a limitation upon the present invention. For example, it is applicable to other apparatus such as a monochromatic copying machine or multi-color copying machine.

<First Embodiment>

Function

Figure 4A:
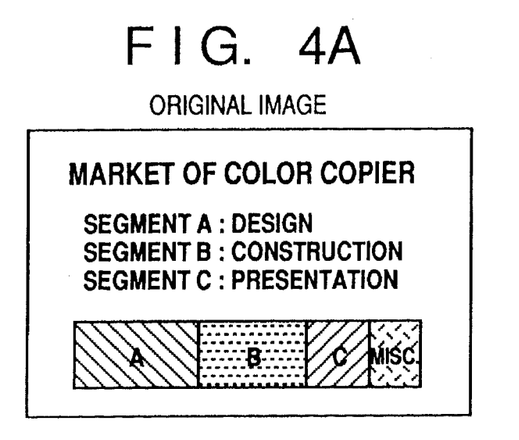
FIGS. 4A to 4C show screens to explain the synthesizing method according to the first embodiment of the present invention.
Figure 4B:
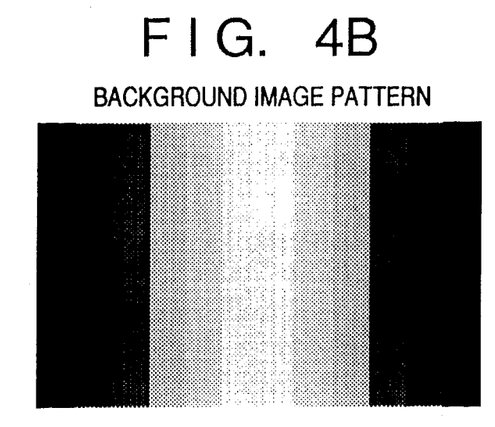
Figure 4C:
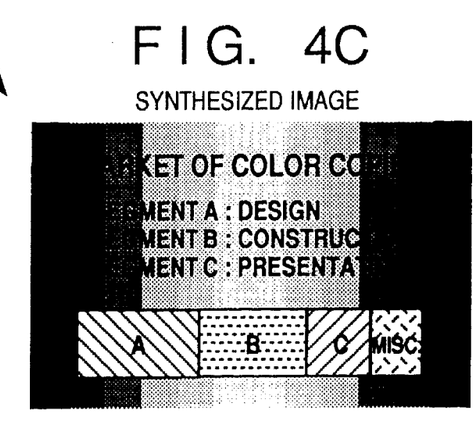

FIGS. 4A–4C show screens to explain the synthesizing method according to the first embodiment of the present invention.

An original image in FIG. 4A and a background image pattern in FIG. 4B prepared beforehand are synthesized and the synthesized image in FIG. 4C is obtained. That is, the synthesized image in FIG. 4C is produced by replacing the background of the original image with the background image pattern and outputted.

The detailed embodiment to execute the above processing in the full-color copying machine is described below.

General description of the apparatus

Figure 2:
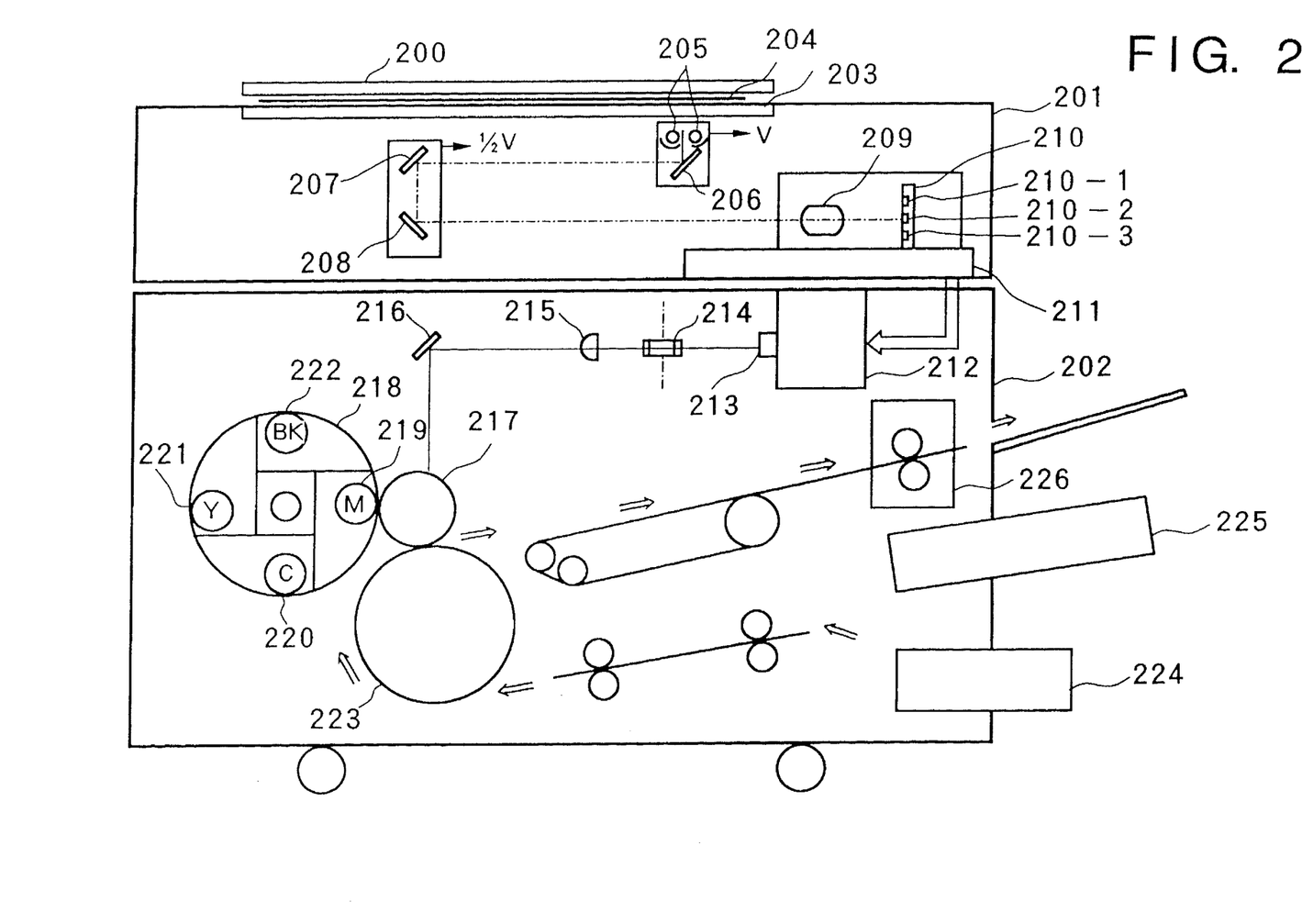
FIG. 2 is a sectional side view showing the construction of a full-color copying machine of the first embodiment of the present invention.

FIG. 2 is a sectional side view showing the construction of a copying machine of a typical embodiment of the present invention.

An image scanning section 201 reads an original image at a resolution of 400 dpi (dots/inch) and generates digital image signals based on the image. A printing section 202 prints a full-color image corresponding to the original image read by the image scanning section 201 on a print sheet at resolution of 400 dpi.

The image scanning section 201 includes a pressure plate having a mirror surface 200. An original 204 on a glass table (platen) 203 is irradiated by means of lamps 205, an image is formed on a three-line sensor (hereinafter referred to as a "CCD") 210 via mirrors 206, 207, and 208 and a lens 209, and the image is sent to a signal processor 211 as full-color information red (R), green (G) and blue (B) components. The entire original is scanned (sub-scanning) by mechanically moving the carriage 227 fixing the lamps 205 and mirror 206 at a velocity v as well as the mirrors 207, 208 at a velocity ½ v in a direction perpendicular to the electrical scanning direction (a main scanning direction) of the line sensor.

The signal processor 211 processes the read image signal, separates the signal into magenta (M), cyan (C), yellow (Y), and black (Bk) components and sends these components to the printing section 202. At least one component among the M, C, Y, Bk components is sent to the printing section 202 per scan of the original in the image scanning section 201, and a single print-out is completed by a total of four scans of the original.

Each image signal M, C, Y or Bk received from the image scanning section 201 is sent to a laser driver 212. The laser driver 212 modulates and drives a semiconductor laser 213 in accordance with the received image signal. The laser light is made to scan across a photosensitive drum 217 via a polygon mirror 214, an f-θ lens 215 and a mirror 216.

A revolving developer 218 comprises a magenta developing section 219, a cyan developing section 220, a yellow developing section 221 and a black developing section 222. These four developing sections come into alternate contact with the photosensitive drum 217 of the revolving developer 218 so that an electrostatic image formed on the photosensitive drum is developed by means of the toners.

A transfer drum 223 upon which paper fed from a paper cassette 224 or 225 is wound so that the image developed on the photosensitive drum 217 may be transferred to the paper.

After four colors M, C, Y and Bk have thus been transferred successively, the paper is ejected through a fixing unit 226.

Image scanner

Figure 1:
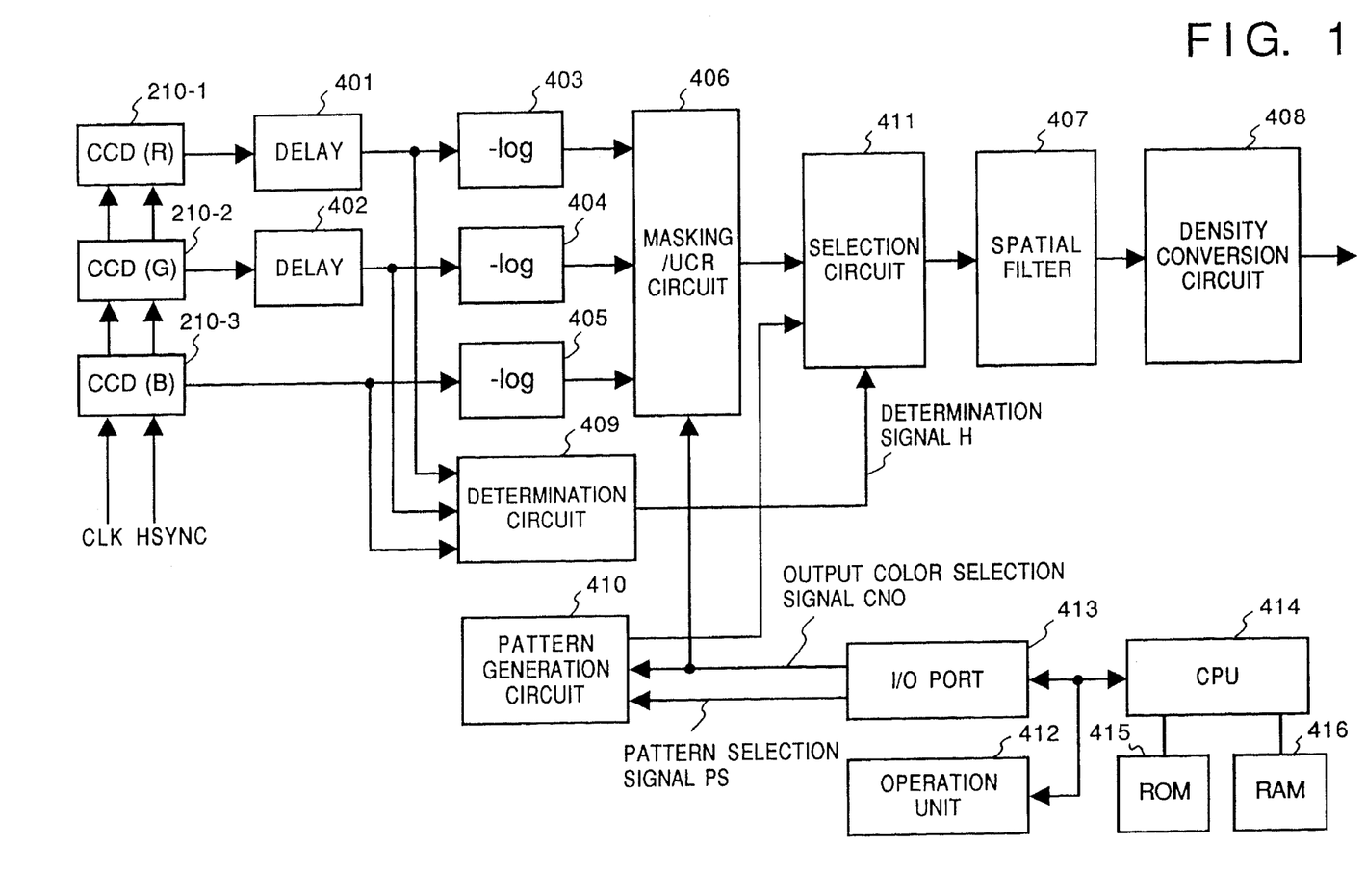
FIG. 1 is a block diagram illustrating the construction of an image scanning section 201 according to the first embodiment.

FIG. 1 is a block diagram showing the construction of the image scanning section 201. CCD 210-1, 210-2, and 210-3 are well-known CCD line sensors (charge coupled device) having spectroscopic sensitivity characteristics such as to be sensitive to red (R), green (G) and blue (B), respectively. After the A/D conversion, an eight-bit signal having a value of 0 to 255 is outputted from the CCD line sensors 210-1, 210-2, and 210-3.

Since the CCD line sensors 210-1, 210-2, and 210-3 used in the first embodiment are placed at regular intervals, relative spatial deviations thereof are corrected by delay elements 401 and 402.

Log converters (logarithmic converters) 403, 404, and 405 comprising an look-up-table ROM or RAM convert an brightness signal (RGB signals) into a density signal (YMC signals). A masking UCR (under color removal) circuit 406 is well known, therefore, the detailed description does not need. In general, the masking UCR circuit 406 frame-sequentially outputs a signal in a predetermined bit length, namely eight bits, based on the input three signals, whenever each of the image signals yellow (Y), magenta (M), cyan (C) and black (Bk) is read.

A selection circuit 411 switches between the image outputted by a pattern generation circuit 410 and the image outputted by the masking UCR circuit 406. The switching of the selection circuit 411 is performed by a determination signal H outputted from a determination circuit 409.

A spatial filter circuit 407 corrects the characteristics of spatial frequencies of an output signal. A density conversion circuit 408 corrects density characteristics of the printing section 202. The density conversion circuit 408 comprises ROMs or RAMs which are similar to those of the log converters 403 to 405.

CPU 414 controls the present apparatus. An input/output port (an I/O port) 413 is connected to the CPU 414. A program which operates the CPU 414 is stored in ROM 415. RAM 416 is used as a work area for executing various programs. Instructions are inputted from the operation unit 412.

A signal CNO, a two-bit output color selection signal, controls the order of the four reading operations (scanning operations) with respect to four output colors M, C, Y, and Bk for each color image. The relationship between the CNO signals and selected output colors is shown in Table 1.

TABLE 1

| CNO SIGNAL | PRINTING OUTPUT |
| --- | --- |
| 0 | MAGENTA (M) |
| 1 | CYAN (C) |
| 2 | YELLOW (Y) |
| 3 | BLACK (Bk) |

The signal CNO is outputted by the CPU 414 through the I/O port 413 to change conditions for the operation of the masking UCR circuit 406 and color patterns outputted from the pattern generation circuit 410.

The functions of the main components of the image scanning section shown in FIG. 1 are described below.

Determination circuit 409

The determination circuit 409 determines an area where the background image pattern generated by the pattern generation circuit 410 is inserted based on the RGB signals of the original image. Since a general background color of the original is white, it can be arranged so as to determine the area of white data in which the RGB values are all nearly 0. Zero indicates the lowest level of each 8-bit color data.

For example, if it is assumed that each value of the RGB signals of the original image data is R, G, B, respectively, and constants are a, b, and c, the circuit determines the area where the following condition is satisfied:

R>a and G>b and B>c

The constants a, b, and c can be set to a large number such as 0~55 by the CPU 414. The constants a, b, and c can be fixed values or variables which are changed by the operation unit 412 in accordance with the background color of the original. Furthermore, in an apparatus including a detection circuit which detects the background color of the original, automatic control is enabled regardless of the background color of the original by using the results of the background color detection.

Pattern generation circuit 410

The pattern generation circuit 410 is a circuit which selects and outputs a pattern to be used for the background out of the plurality of patterns registered beforehand, at image synthesis.

The pattern of FIG. 4B can be replaced by one of the patterns shown in FIGS. 5A–5D.

A pattern generation circuit which generates the gradation patterns shown in FIG. 4B and FIGS. 5A–5D can be easily constituted at low cost by using a counter. A CLK signal which is a reference clock in the main scanning direction or HSYNC signal which is a reference synchronizing signal in the sub-scanning direction, as indicated in FIG. 1, is counted by the counter and the count value is outputted to the selection circuit 411 as density data. The gradation can be adjusted by changing the number of count-output bits of the counter or performing a thinning-out operation.

Furthermore, in order to perform coloring processing, the following processing can be performed by the CNO signal. For example, in a case where the background image pattern is formed in cyan, the pattern generation circuit 410 performs a pattern output based on the input from the counter only when the value of the CNO signal is "1". When the value of the CNO signal is other than "1", the value "0" is outputted and no image is outputted. In a case where data on a compound color is required, a combination of arbitrary colors is possible if the counter output 0~255 is adjusted so as to be 0~128, when each color is outputted, by using a look-up-table (hereinafter referred to as a "LUT") using a memory.

Figure 5A:
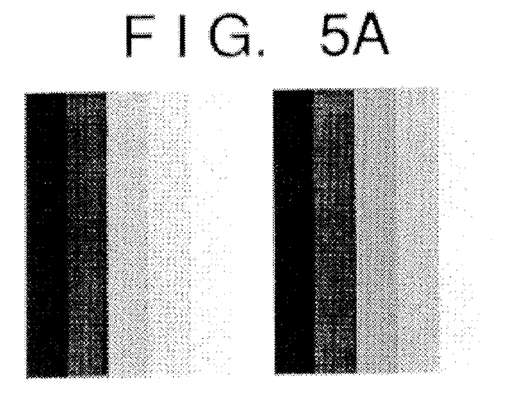
FIGS. 5A to 5D show examples of the patterns according to the first embodiment.
Figure 5B:
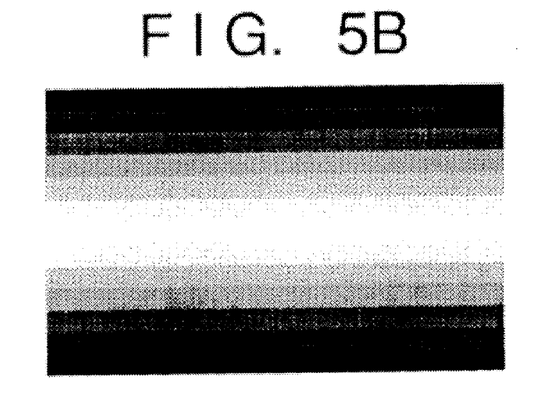
Figure 5C:
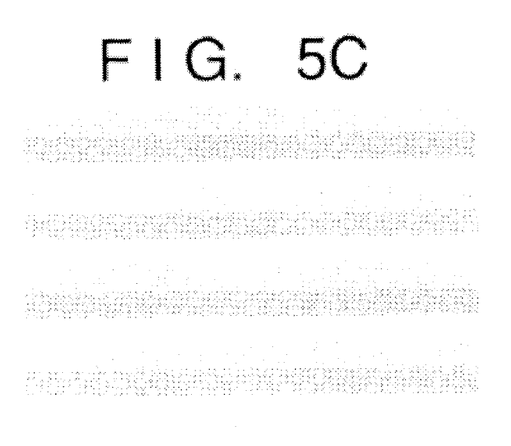
Figure 5D:
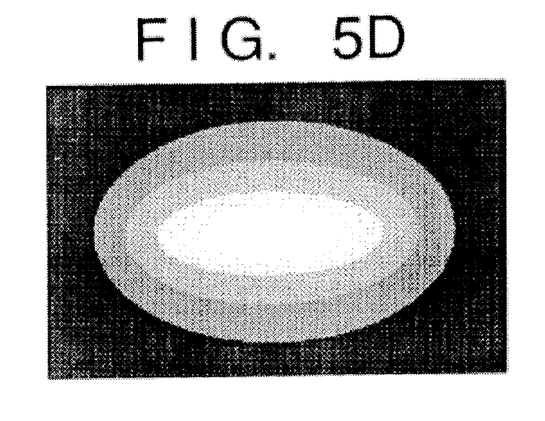

When the background image pattern shown in FIG. 5D is generated, the pattern can be easily produced if a memory is used in addition to the counter.

In the present embodiment, since an image pattern used for the background is relatively simple, the resolution of the background image pattern does not have to have the same resolution of the printing section. In this case, the background image pattern having a low resolution is stored in the memory and outputted by enlarging this. If coloring is performed in the above-described way, only a single background image pattern needs to be provided in the memory and the pattern generation circuit 410 can be realized by the memory having a considerably small capacity.

Selection circuit 411

The selection circuit 411 can be a circuit such as 74LS157 made by Texas Instruments. For example, if the determination circuit 409 determines input image data as the background, the synthesized image shown in FIG. 4C can be obtained, by the selection circuit 411, by selecting and outputting the image of the pattern generation circuit 410. If not, the image of the masking UCR circuit 406 is selected and outputted.

Operation unit 412

Figure 3:
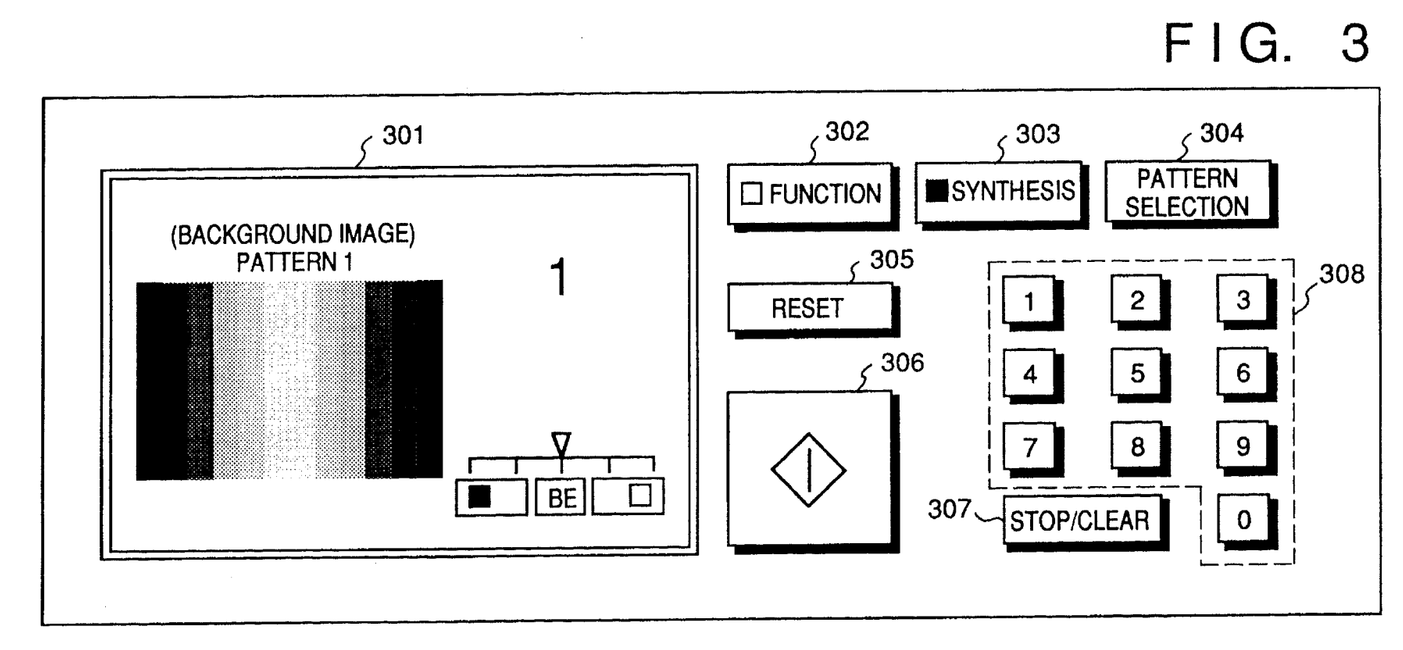
FIG. 3 is a view of the operational panel of an operation unit 412 according to the first embodiment.

FIG. 3 is a view of the operation panel of the operation unit 412 according to the first embodiment. In FIG. 3, a touch panel display 301 using a liquid crystal display capable of displaying in color and a touch panel including an area for displaying the background image pattern on the left, an area for displaying the number of copies to be made on the right, and an area for operating the density adjustment on the right bottom is shown.

A function key 302 is a key to select a synthesis function such as color conversion, masking, and trimming. The function key 302 has an LED built-in.

A synthesis key 303 is a key to activate the image synthesis. The synthesis key 303 also has an LED built-in used to display set/release of the image synthesis. A pattern selection key 304 is used when a pattern is selected at the image synthesis. A reset key 305 is used when the setting on various types of copies is returned to the standard condition.

A copy key 306 is used when a start of the copy operation is instructed. A stop/clear key 307 is used in order to suspend the operation. The stop/clear key 307 is also used when the number of copies is reset.

A ten key pad 308 is to input numbers and used when the number of copies and the background image pattern to be synthesized are selected.

Flowchart

Figure 6:
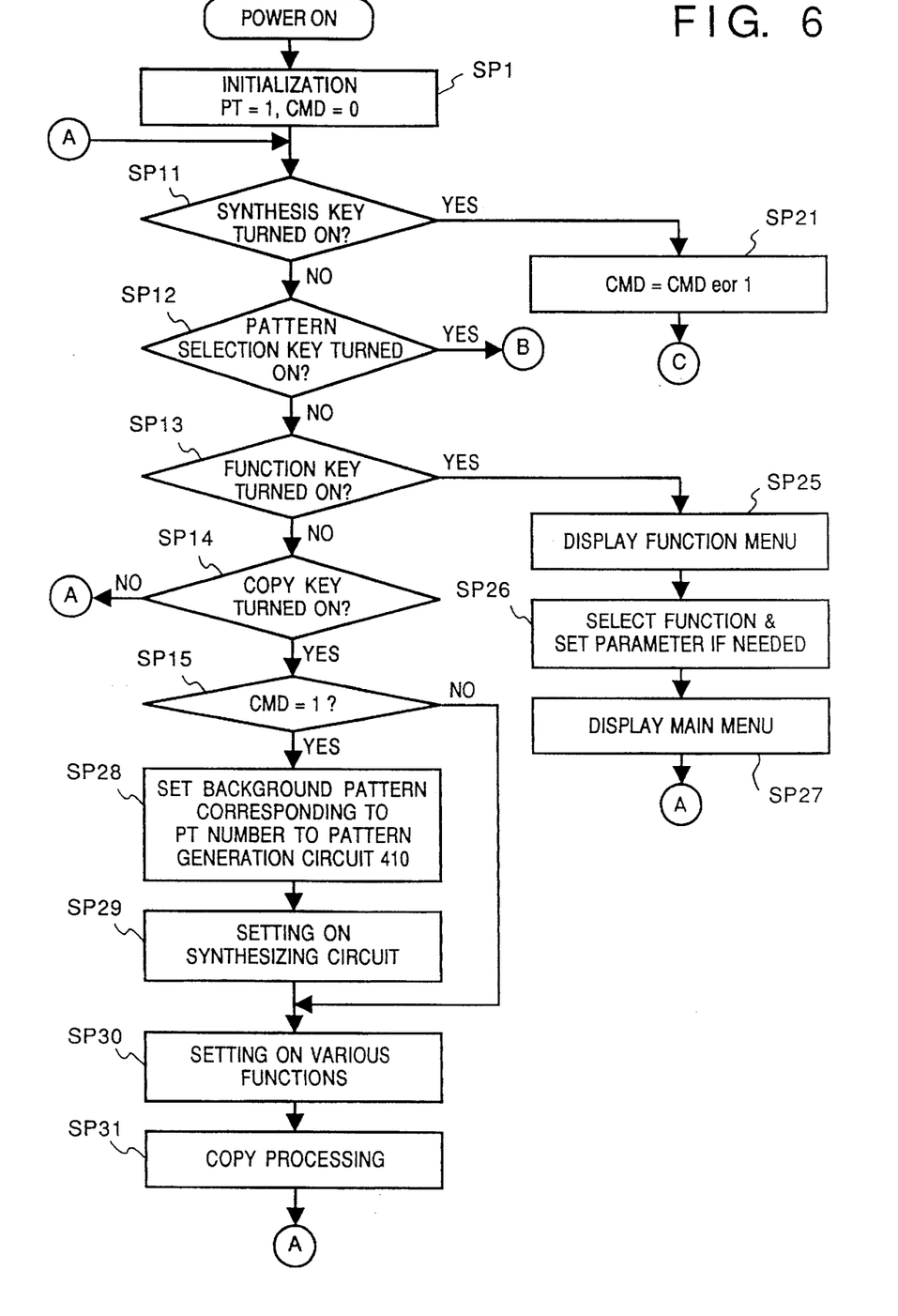
FIG. 6 is a flowchart to explain an example of the program executed by the CPU 414 according to the first embodiment.
Figure 7:
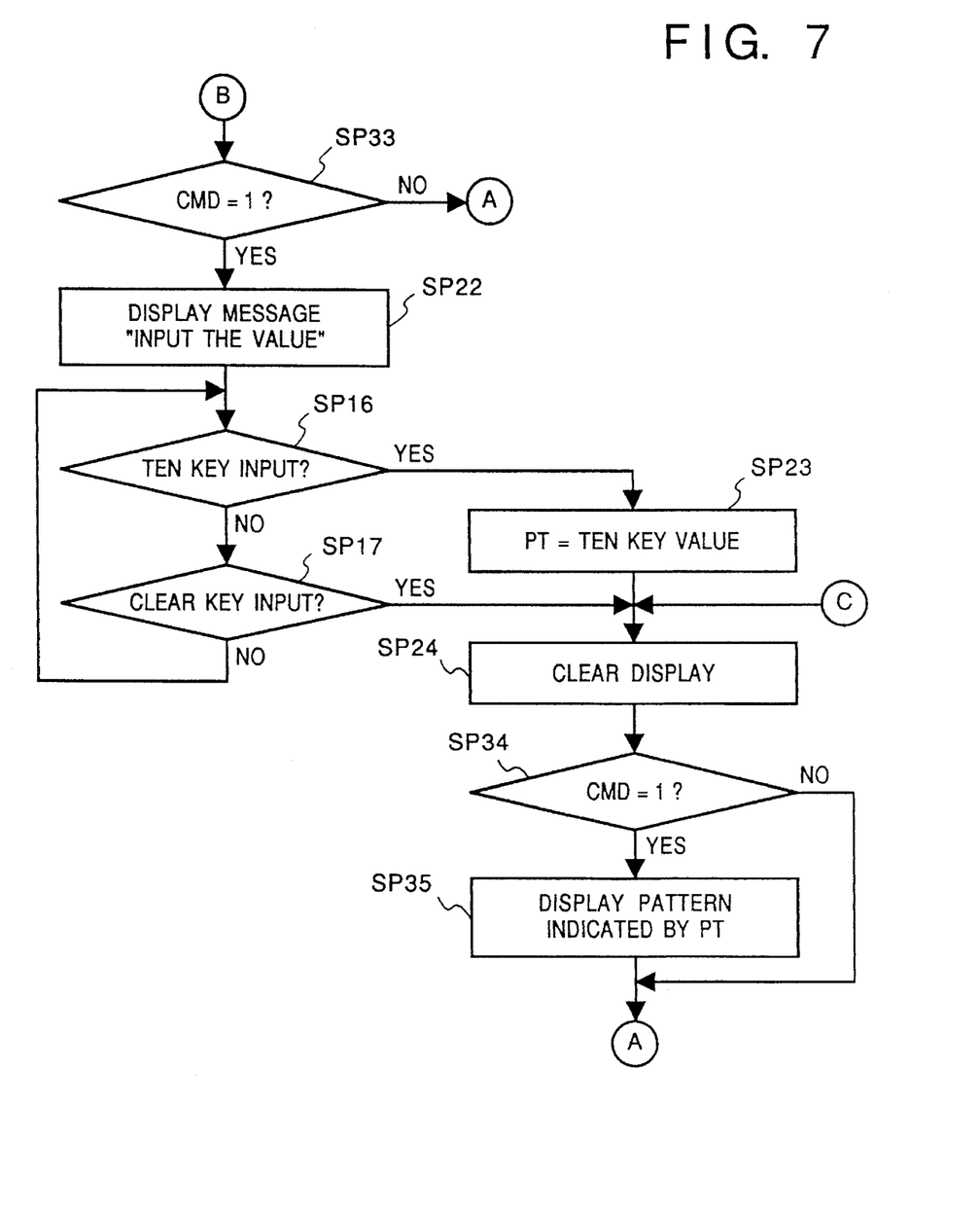
FIG. 7 is another flowchart to explain an example of the program executed by the CPU 414 according to the first embodiment.

Accompanying with FIGS. 6 and 7, the flowchart of an example of the program executed by the CPU 414 is described. This program is stored in the ROM 415.

In FIGS. 6 and 7, at step SP1, an initializing operation is performed. Initial values of a parameter PT and command CMD which are used Later are set respectively.

After step SP1, a loop to return to the point A is established. Steps SP11 through SP14 are processings to determine input from each key.

At step SP11, whether or not the synthesis key 303 is pressed is determined. If pressed, the process proceeds to step SP21, while if not, the process proceeds to step SP12. At step S21, the command CMD takes an exclusive OR (EOR) with the value "1", and the value is changed as 0, 1, 0. It can be set such that when the value of CMD is "1", the image synthesizing function becomes active. At this time, the built-in LED is lit.

At step SP12, it is determined whether or not the pattern selection key 304 is pressed. If pressed, the process proceeds to step SP33, while if not, the process proceeds to step SP13. At step SP33, the value of the command CMD is determined If the value is "1", the process proceeds to step SP22, while if the value is "0", the process returns to step SP11. After step SP 22, the processing for pattern selection is performed. The pattern selection key 304 can be operated only when the image synthesizing function is in active at step SP33.

At step SP13, it is determined whether or not the function key 302 is pressed. If pressed, the process proceeds to step SP25 and the processing thereafter is executed. If not, the process proceeds to step SP14.

At step SP14, it is determined whether or not the copy key 306 is pressed. If pressed, the processing at step SP15 thereafter is executed. If not, the process returns to the point A.

The processing at the pattern selection is described below.

At step SP22, the message "INPUT THE VALUE" is outputted to the touch panel display 301. At steps SP16 and SP17, a key input is waited.

At step SP16, Whether or not the ten key 308 is pressed is determined. If the key is pressed, the process proceeds to step SP23 where the value of the parameter PT is replaced by the number inputted from the ten key 308. In the present embodiment, ten types of patterns are prepared and each of which corresponds to 0~9 of ten key pad 308, thus simplifying the operation.

At step SP17, an input from the stop/clear key 307 is determined. If the stop/clear key 307 is pressed, the process proceeds to step SP24. While if not, the process returns to step SP16.

The processings after the point C are the same as these processed when the synthesis key 303 is pressed and the background image pattern is outputted.

At step SP24, the background image pattern displayed on the touch panel display 301 is cleared. At step SP34, it is determined whether or not the image synthesizing function is inactive. The background image pattern is displayed when the image synthesizing function is being activated. That is, only when the value of the command CMD is "1", step SP35 is executed.

At step SP35, the pattern indicated by the number of the parameter PT is displayed at a predetermined position of the touch panel display 301.

The processing when the function key 302 is pressed is described below.

At step SP25, the menu of the functions capable of being used is displayed on the touch panel display 301. The process proceeds to step SP26 where the function designated by the operation of the touch panel is selected and the parameter is set if needed. At step SP27, a standard image screen as shown in FIG. 3 is displayed and the process ends.

The processing when the copy key 306 is pressed is described below.

At step SP15, it is determined whether or not the image synthesizing function is inactive. If "active", the process proceeds to step S28 where setting for the image synthesis is performed.

At step SP28, data concerning the background image patterns indicated by the parameter PT is set in the pattern generation circuit 410.

Setting of the circuit concerning the image synthesis is performed at step SP29. For example, information on the determination for switching the image set in the determination circuit 409 and conditions where the synthesis is partially performed are set.

At step SP30, setting on the selected function is performed and the processing for copying is performed at step SP31.

As described above, according to the first embodiment, when the background image pattern prepared beforehand replaces the background of the established original image to be copied, the original on hand can be processed to impressive materials, such as materials for presentation, without additional apparatus.

In FIG. 3, the background image pattern is displayed one by one, and one of the patterns is selected. However, it can tie arranged such that a plurality of the background image patterns can be displayed at once and one of the patterns is selected.

<Second Embodiment>

In the first embodiment, an example to synthesize the image read from the original with the background image pattern is described. However, this does not impose a limitation upon the present invention. As will be described in the second embodiment, the present invention can be arranged to perform a more complicated image synthesis.

For example, in a case where density or hue of the background image pattern to be synthesized is similar to that of the original, the synthesized image cannot be put to practical use and some modification is required.

A method for the modification is to add the function which changes the color of the background image pattern to be synthesized. For example, if the original image is composed of black and red, it can be arranged that the background image pattern has colors other than black and red. When the color of the background image pattern is selected to be cyan, the following control is performed.

In FIG. 1, as shown in Table 1, the pattern generation circuit 410 outputs the background image pattern in the order of magenta, cyan, yellow, and black, for the output color selection signal CNO. In this case, the pattern generation circuit 410 outputs the actual background image pattern to the selection circuit 411 only when cyan is selected by signal CNO. In case of another color, the pattern generation circuit 410 can be controlled so as not to output the background image pattern. Selection of the color can be performed when a pattern is selected or the processing can be added as a function setting.

As described above, the color of the background image pattern can be easily changed by the simple method.

<Third Embodiment>

Another modification is further required when many colors are used in the original or when the present invention is applied to a monochromatic copying machine.

In this case, it can be arranged so that the foreground area and background area are processed at image synthesis. In the third embodiment, this process is described.

For example, it can be arranged to provide a boundary having a predetermined width between the foreground area and background area (i.e. white area). More particularly, a process to expand the area which is determined as a foreground area by the determination circuit 409 can be added. To do so the result of determination of the determination circuit 409 is stored for several lines by using a line memory. The area which is determined as a foreground area is expanded approximately several pixels to 50–60 pixels by using a logical circuit. The gap between the foreground area and background area is made because the background of the original is outputted to the expanded foreground area.

Furthermore, when the density and color of the background image pattern and those of the foreground image are similar, the foregoing process permits ready differentiation between the background area and the foreground area.

<Fourth Embodiment>

In each embodiment, it is assumed that predetermined background image patterns are stored in the pattern generation circuit 410. However, this does not impose a limitation upon the present invention. For example, it can be arranged so that the function to read an image of the scanning section is used, the background image pattern is read from the original on the platen, and the read pattern is registered with the pattern generation circuit 410.

The present invention can be applied to a system constituted by a plurality of devices, or to an apparatus comprising a single device. Furthermore, it goes without saying that the invention is applicable also to a case where the object of the invention is attained by supplying a program to a system or apparatus.

In each embodiment described above, a laser beam printer is described as an example. However, this does not impose a limitation upon the present invention, for the invention is applicable also to an ink-jet printer and a thermosensitive printer. In particular, the invention is applicable to a so-called bubble-jet printer employing a head of the type which jets droplets by utilizing film boiling that relies upon thermal energy.

Furthermore, in each of the foregoing embodiments, the image of an original is inputted by the scanning section. However, this does not impose a limitation upon the invention, for it is permissible to input an image entered by a still-video camera or ordinary video camera, as well as an image produced by computer graphics. Still further, as a background image pattern in the fourth embodiment, the image obtained by the above-described method can be used.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

converting means for converting a document image into image data;

background color pattern generation means for generating a background color pattern which includes gradation;

synthesizing means for synthesizing the background color pattern generated by said background color pattern generation means with the image data from the document image converted by said converting means to form synthesized image data, said synthesizing means performing the synthesizing in synchronization with the converting performed by said converting means; and output means for outputting the synthesized image data.

2. The apparatus according to claim 1, wherein said background color pattern generation means comprises:

storage means for storing a plurality of background color patterns generated by said background color pattern generation means; and selection means for selecting one of the plurality of background color patterns stored in said storage means for synthesizing by said synthesizing means.

3. The apparatus according to claim 1, wherein said background color pattern generation means registers the image data converted by said converting means as registered background color patterns, and outputs one of the registered background color patterns for synthesizing by said synthesizing means.

4. The apparatus according to claim 1, wherein said background color pattern generation means comprises designation means for designating a color for the background color pattern to be generated by said background color pattern generation means, and for outputting the background color pattern in the color designated by said designation means.

5. The apparatus according to claim 1, wherein said synthesizing means comprises determination means for determining a background area of the image data converted by said converting means, and for replacing the background area with the background color pattern.

6. The apparatus according to claim 5, wherein said determination means replaces the background area with the background color pattern, and provides a boundary having a predetermined width between the background color pattern and an image area of the image data.

7. The apparatus according to claim 5, wherein said determination means determines the background area of the image data by determining whether an area of the image data has an image density which is less than a predetermined value, and by designating such an area as the background area.

8. The apparatus according to claim 6, wherein said determination means determines the background area of the image data by removing the boundary between the background color pattern and the image area of the image data, determining whether an area of the image data has an image density which is less than a predetermined value, and designating such an area as the background area.

9. The apparatus according to claim 1, wherein said output means outputs the image data using electronic photography.

10. The apparatus according to claim 1, further comprising input means for inputting the document image by scanning an original image.

11. An image processing method comprising:

a converting step for converting a document image into image data;

a background color pattern generation step for generating a background color pattern which includes gradation;

a synthesizing step for synthesizing the background color pattern generated in said background color pattern generation step with the image data of the document image converted in said converting step to form synthesized image data, said synthesizing step being performed in synchronization with said converting step; and an output step for outputting the synthesized image data.

12. The method according to claim 11, wherein said background color pattern generation step comprises:

a storage step for storing a plurality of background color patterns generated in said background color pattern generation step; and a selection step for selecting one of the plurality of background color patterns stored in said storage step for synthesizing in said synthesizing step.

13. The method according to claim 11, wherein said background color pattern generation step registers the image data converted in said converting step as registered background color patterns, and outputs one of the registered background color patterns for synthesizing in said synthesizing step.

14. The method according to claim 11, wherein said background color pattern generation step comprises a designation step for designating a color for the background color pattern to be generated in said background color pattern generating step, and for outputting the background color pattern in the color designated in said designation step.

15. The method according to claim 11, wherein said synthesizing step comprises a determination step for determining a background area of the image data converted in said converting step, and for replacing the background area with the background color pattern.

16. The method according to claim 15, wherein said determination step replaces the background area with the background color pattern, and provides a boundary having a predetermined width between the background color pattern and an image area of the image data.

17. A copying machine comprising:

an operation designating means for designating one of plural copying operations to be performed by said copying machine in response to an instruction manually input by a user, the plural copying operations including a background selection operation of selecting a background image pattern from among plural background image patterns which include gradation;

a copying engine for copying a document; and generating means for, when the background selection operation is designated, generating the selected background image pattern for synthesis with the document.

18. A copying machine according to claim 17, wherein the plural copying operations include an operation for setting a number of copies, and wherein said operation designating means includes a ten-key pad for setting the number of copies.

19. A copying machine according to claim 17, wherein said operation designating means includes a selection key for designating the background selection operation.

* * * * *

UNITED STATES PATENT AND TRADEMARK OFFICE
CERTIFICATE OF CORRECTION

PATENT NO. : 5,555,093

DATED : September 10, 1996

INVENTOR : Nao Nagashima

It is certified that error appears in the above-identified patent and that said Letters Patent is hereby corrected as shown below:

COLUMN 1:

Line 16, "tion-software's" should be --tion-software--.

COLUMN 3:

Line 9, "resolution" should be --a resolution--; and
Line 67, "does" should be --is--.

COLUMN 4:

Line 1, "need." should be --needed.--.

COLUMN 6:

Line 11, "Later" should be --later--;
Line 18, "step S21", should be --step SP21,--;
Line 26, "determined" should be --determined.--;
Line 31, "in active" should be --inactive--;
Line 44, "Whether" should be --whether--;
Line 53, "step S24. While if not," should read --step SP24, while if not,--; and
Line 55, "these" should be --those--.

UNITED STATES PATENT AND TRADEMARK OFFICE
CERTIFICATE OF CORRECTION

PATENT NO. : 5,555,093

DATED : September 10, 1996

INVENTOR : Nao Nagashima

It is certified that error appears in the above-identified patent and that said Letters Patent is hereby corrected as shown below:

COLUMN 7:

Line 13, "step S28" should be --step SP28--; and
Line 34, "tie" should be --be--.

Signed and Sealed this

Twenty-fifth Day of February, 1997

Attest:

BRUCE LEHMAN

Attesting Officer

Commissioner of Patents and Trademarks